Patented Jan. 8, 1935

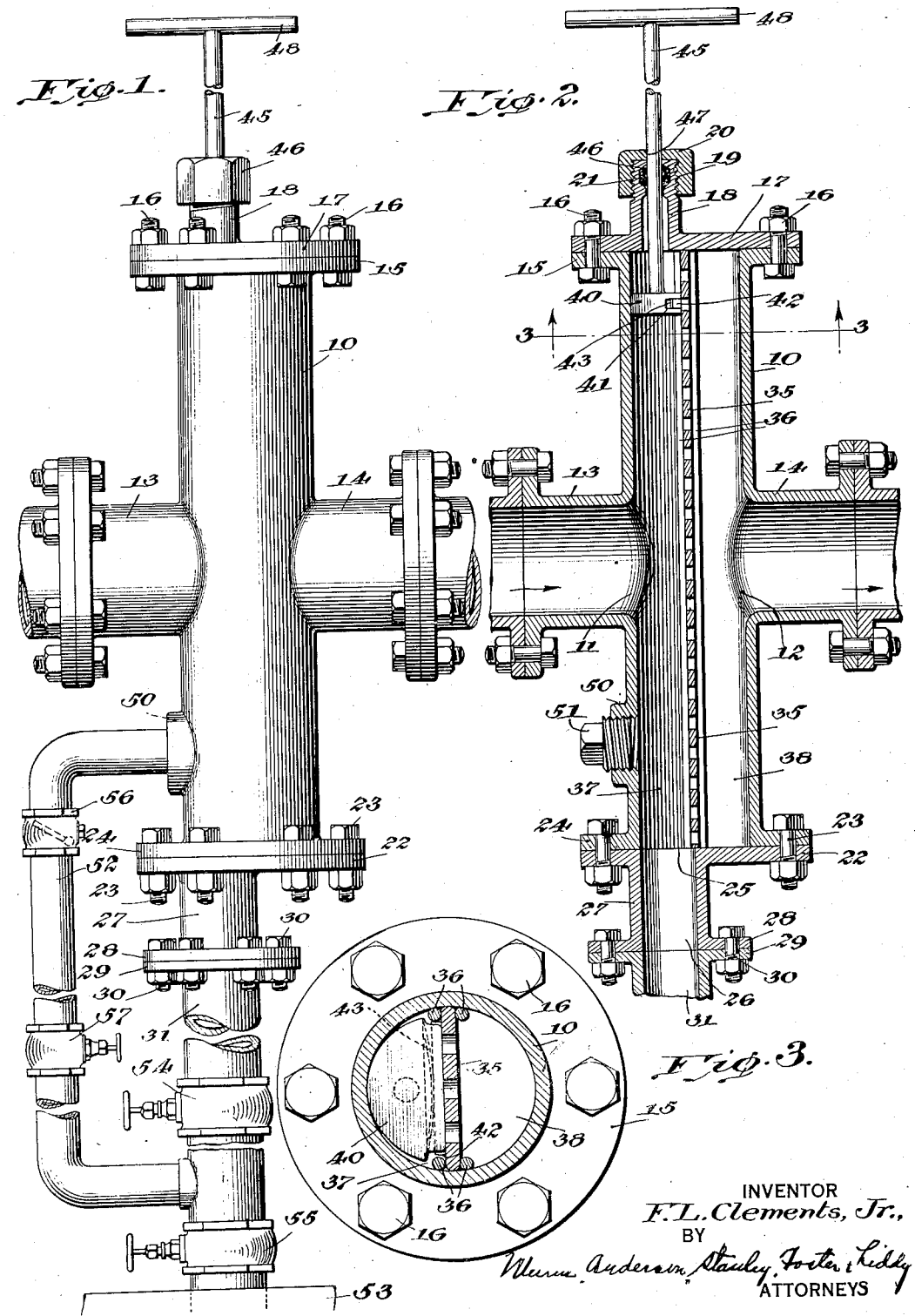

1,987,142

UNITED STATES PATENT OFFICE 1,987,142

STRAINER FOR PIPE LINES

Frank L. Clements, Jr., Luling, Tex.

Application January 23, 1934, Serial No. 707,967

2 Claims. (Cl. 210—167)

This invention relates to a strainer for pipe lines.

An object of the invention is the provision of a strainer for pipe lines in which a perforated plate or partition divides a tubular member into an inlet chamber and an outlet chamber with means movable over the perforated plate for removing solid particles or foreign matter which have been strained out of the liquid by the perforated plate.

Another object of the invention is the provision of a strainer for pipe lines in which the foreign matter collected on a screen may be removed without cutting off the flow of liquid through the pipe line.

A further object of the invention is the provision of a strainer for pipe lines in which a hollow body member is incorporated in the line and located at right angles to the flow of liquid through the lines, a perforated plate forming a screen being removably mounted longitudinally of the body, thereby providing an inlet chamber and an outlet chamber, a plunger having a spring-pressed blade being movable over the perforated plate for removing foreign matter or solid particles collected on the perforated plate, means being employed for withdrawing the foreign matter removed by the plunger from the hollow body.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a view in elevation of a strainer constructed in accordance with the principles of my invention, Figure 2 is a vertical section of the strainer, and Figure 3 is a horizontal section taken along the line 3—3 of Figure 2.

Referring more particularly to the drawing, 10 designates a tubular or hollow body member which has diametrically disposed openings 11 and 12 located intermediate the ends of the hollow body. A flanged inlet pipe 13 is connected with the hollow body and is in communication with the port 11. A flanged pipe 14 is connected to the hollow body at a diametrically opposite point from the port 11 and is in communication with the port 12. The pipe 13 provides an inlet conduit while the pipe 14 forms a discharge conduit for the interior of the body member 10.

One end of the body is provided with a flange 15 to which is connected by means of bolts 16 a cover plate 17 for closing one end of the body member.

A hollow boss 18 is formed integrally with the cover 17 and is provided with a threaded end 19 upon which a cap 20 is screwed. The boss is provided with a packing 21.

The opposite end of the body member is likewise provided with a cover plate 22 which is secured to a flange 24 formed integrally with the body member.

The cover plate 22 is provided with an opening 25 which is in a line with the passage 26 and a pipe 27, the pipe being formed integrally with the cover plate 22. The outer end of the pipe 27 has a flange 28 and a flange 29 is connected by means of bolts 30 with the flange 28 of the pipe 27.

A pipe 31 formed integrally with the flange 29, together with the pipe 27, forms a discharge means for foreign matter from the interior of the body member 10 as will be presently explained. The pipe 31 extends to a sump adjacent the oil line, represented by the pipes 13 and 14.

A perforated plate 35 is located longitudinally of the hollow body member 10 and disposed along the diameter of said body member. Pairs of guides 36 are secured to the inner wall of the body member upon opposite sides of the perforated plate to provide means for removably supporting the perforated plate or partition 35 within the body member. When the cover plate 17 is removed the perforated plate may be withdrawn from the body member. If desired, however, the perforated plate may be cast integrally with the body member 10.

The perforated plate forms a strainer for fluid flowing from the pipe 13 and is adapted to remove solid particles or foreign matter from the liquid passing through the body member 10. The perforated plate or partition 35 divides the body member into an inlet chamber 37 and an outlet chamber 38.

A plunger 40 is located in the inlet chamber 37 and is shaped to conform to a cross sectional area of the inlet chamber 37. An edge of the plunger which is located adjacent one face of the perforated plate 35 is provided with a slot 41 in which is mounted a plate 42. A spring 43 secured to the inner edge of the plate engages the bottom of the plate 42 and forces the outer edge of the plate in flat contact with one face of the perforated plate 35.

The plunger 40 is operated by a rod 45 which extends through a packing 46 in the outer end of the boss 18. This rod also extends through a passage 47 in the cap 20. The outer end of the rod is provided with a handle 48 whereby the rod and likewise the plunger may be reciprocated.

The body member 10 adjacent the inlet chamber 37 is provided with an internally threaded hollow boss 50 which is closed by a threaded plug 51 when a pipe 52 is not used as shown in Figs. 2 and 1, respectively.

The pipe 52 is placed in communication with the chamber 37 after the plug 51 has been removed. The outer end of said pipe is connected to the pipe 31 above the sump 53 and between the gate valves 54 and 55.

The pipe 52 has a check valve 56 near its connection with the chamber 37 and a gate valve 57 near the connection of the pipe with the pipe 31.

The operation of my device is as follows: The hollow body member 10 is included in the pipe line and located transversely of the flow of the liquid so that the liquid from the pipe line 13 will enter the inlet chamber 37, then pass through the perforated plate or partition 35 and enter the outlet chamber 38 free of foreign matter. This strained liquid will then be discharged through the pipe 14. The plunger 40 is normally located in the position shown in Fig. 2 and is periodically reciprocated in the inlet chamber 37 for removing the foreign matter collected upon the face at the inlet side of the body member and this foreign matter is forced downwardly through the port 25 and into the pipe 27. The plunger, through the spring-pressed blade 42, will remove all solid particles collected upon the strainer 35 and also will remove waxy material which has been freed from oil when the device is used as a strainer for oil lines. The gate valve 55 will be normally closed during the operation of the plunger and will be opened only when the plunger 43 has reached approximately the opening 25.

When the pipe 52 is employed the pipe 31 is left full of fresh oil between the two gate valves 54 and 55. Before starting to move the plunger 42, valves 54 and 57 are opened. The plunger 40 is moved downwardly until it reaches its seat on the cover plate 22. Then the valves 54 and 57 are closed and valve 55 is opened after which the plunger 40 is moved away from its seat on the cover plate 22 sufficiently far and for a sufficient length of time to flush solid particles out of the sump 53.

With the valves 54 and 57 open and the plunger 42 moving towards the opening 25, the liquid from the pipe 31 will be forced through the pipe 52 past the check valve 56 and into the inlet chamber 37 due to the fact that the valve 55 remains closed and cuts off communication between the pipe 31 and the sump 53.

The pipe 52 acts as a by-pass and prevents the clean liquid from entering the sump. The flow of the liquid through the pipe 52 is permitted where it is found impractical to allow clean fluid to pass to said sump.

I claim:

1. A strainer for pipe lines comprising a tubular member, a perforated partition disposed longitudinally of the tubular member and dividing the tubular member into inlet and outlet chambers, an inlet pipe communicating with the inlet chamber, a discharge pipe communicating with the outlet chamber, a plunger in the inlet chamber and movable over the perforated partition for removing foreign matter collecting on said plate, said plunger substantially closing the space between the perforated partition and the walls of the tubular member and acting as a piston, a sump, an outlet pipe connecting one end of the inlet chamber with the sump, a by-pass having one end communicating with the inlet chamber and the other end communicating with the outlet pipe adjacent the sump, a valve at each side of the connection between the by-pass and the outlet pipe and disposed in the outlet pipe, and a check valve in the by-pass adapted to prevent liquid from being forced by the plunger from the inlet chamber to the by-pass but permitting liquid to be forced from the by-pass into the inlet chamber.

2. A strainer for pipe lines comprising a tubular member, a perforated partition forming a screen and dividing the tubular member longitudinally into an inlet chamber and an outlet chamber, an imperforate plunger mounted for reciprocation in the inlet chamber and having a straight edge resting on the partition, said plunger substantially closing the space between the perforated partition and the walls of the tubular member and acting as a piston, the plunger being semi-circular in cross section and conforming in shape to the cross sectional area of the inlet chamber, a flush tank, a pipe connecting one end of the inlet chamber with the flush tank, a valve in the pipe, normally closed but adapted to be opened just before the plunger reaches the end of the inward stroke thereof.

FRANK L. CLEMENTS, Jr.